United States Patent [19]

Bertrand

[11] Patent Number: 5,438,575
[45] Date of Patent: Aug. 1, 1995

[54] DATA STORAGE SYSTEM WITH STALE DATA DETECTOR AND METHOD OF OPERATION

[75] Inventor: Keith J. Bertrand, Sunnyvale, Calif.

[73] Assignee: Ampex Corporation, Redwood City, Calif.

[21] Appl. No.: 976,870

[22] Filed: Nov. 16, 1992

[51] Int. Cl.⁶ .................. G06F 11/00; G08C 25/00; H03M 13/00; H04L 1/00
[52] U.S. Cl. .................. 371/48; 371/53; 371/51.1
[58] Field of Search .............. 358/314, 486, 496, 92; 340/827, 825.08; 371/57.1, 60, 51.1, 53, 59, 37, 21.2, 21.4, 33, 48; 395/425, 575; 364/246.91; 365/49

[56] References Cited

U.S. PATENT DOCUMENTS

| | | | |
|---|---|---|---|
| 4,393,414 | 7/1983 | Reitmeier | 358/336 |
| 4,447,902 | 5/1984 | Wilkinson | 371/39 |
| 4,495,623 | 1/1985 | George | 371/38 |
| 4,609,358 | 9/1986 | Sangster | 434/307 |
| 4,653,055 | 3/1987 | Micic | 371/69 |
| 4,710,921 | 12/1987 | Ishidoh | 370/110.1 |
| 4,726,028 | 2/1988 | Himeno | 371/37 |
| 4,821,171 | 4/1989 | Calamari | 364/200 |
| 4,831,521 | 5/1989 | Rutherford, Jr. | 364/200 |
| 4,864,562 | 9/1989 | Murakami | 370/84 |
| 4,949,248 | 8/1990 | Caro | 364/200 |
| 4,953,164 | 8/1990 | Asakura | 371/40.1 |
| 4,964,129 | 10/1990 | Bowden | 371/40.2 |
| 5,058,116 | 12/1991 | Leger et al. | 371/10.1 |
| 5,077,607 | 12/1991 | Johnson | 358/86 |
| 5,077,737 | 10/1991 | Chao et al. | 371/40.2 |
| 5,084,837 | 1/1992 | Matsumoto et al. | 395/250 |
| 5,113,514 | 5/1992 | Albonesi et al. | 395/425 |
| 5,121,396 | 6/1992 | Irvin | 371/53 |
| 5,138,459 | 8/1992 | Roberts | 358/209 |
| 5,150,293 | 9/1992 | Murata | 364/419 |
| 5,276,445 | 1/1994 | Mita | 340/825.79 |
| 5,278,846 | 1/1994 | Okayama | 371/37.1 |
| 5,307,355 | 4/1994 | Lauck | 371/37.1 |
| 5,313,408 | 5/1994 | Goto | 364/514 |
| 5,315,581 | 5/1994 | Nakano | 370/16 |
| 5,321,815 | 6/1994 | Bartolanzo | 395/200 |

FOREIGN PATENT DOCUMENTS

| | | |
|---|---|---|
| 0287334 | 10/1988 | European Pat. Off. . |
| 0377894 | 7/1990 | European Pat. Off. . |
| 0412267 | 2/1991 | European Pat. Off. . |
| 0433520 | 8/1991 | European Pat. Off. . |
| 0563491 | 10/1993 | United Kingdom .................. 371/48 |

OTHER PUBLICATIONS

Peterson et al., "Error-Correcting Codes", Mit Press 2nd Ed., 1972, pp. 1-17, 269-308 and 357-377.
"Decision Making with Flags" in Computer Design Article by Donaghey found in V15 N12 Dec. 1976 pp. 77-83.

*Primary Examiner*—Robert W. Beausoliel, Jr.
*Assistant Examiner*—Ly V. Hua
*Attorney, Agent, or Firm*—John G. Mesaros; George B. Almeida

[57] ABSTRACT

A low cost, high speed data storage system provides word-by-word stale data detection while avoiding the need to both read and write a single memory location during a memory read operation. Two flag data storage bits are provided for each word location in addition to the normal data storage bits. As blocks of data are received by the storage system one of the two flag bits is assigned to the block on an alternating basis. Upon writing data to an address location, an assigned flag bit is written to a first state to indicate valid data. When reading, the corresponding assigned flag bit is output as a stale or invalid data signal and the nonassigned flag bit is set to a second state different from the first state in preparation for the next block of data.

17 Claims, 4 Drawing Sheets

FIG. 1

| 30 | | | 34 | 36 | |
|---|---|---|---|---|---|
| | 0000 | D(17:0) | D(18) | D(19) | 32 |
| | 0001 | D(17:0) | D(18) | D(19) | |
| 30 | 0002 | D(17:0) | D(18) | D(19) | |
| | 0003 | D(17:0) | D(18) | D(19) | |

DATA STORAGE SYSTEM WITH STALE DATA DETECTOR AND METHOD OF OPERATION

BACKGROUND OF THE INVENTION

The present invention relates to method and apparatus for detecting "stale data" at addressable storage locations within a data storage system. Data is considered to be stale when it is read a second time without being written between the current read operation and a preceding read operation.

Memory buffers are frequently employed in applications requiring an arrangement that permits data to be alternately written to and read from memory storage locations. In many of these applications, however, operating conditions are frequently encountered where a storage location is addressed for successive read operations without an intervening write operation. For example, memory buffers are widely used for data rate matching purposes, in which the memory write and read operations are conducted at different rates. In circumstances when the read operations are conducted at a rate significantly greater than the rate of the write operations, successive read operations of a storage location can occur without an intervening write operation. Memory buffers are also widely used to change the order of data increments, which is typically accomplished by reading data increments from storage locations in an order different from the order in which they were written. Such operations of memory buffers also can lead to successive read operations of a storage location without an intervening write operation. Occasionally, memory buffers are used in applications requiring the simultaneous performance of rate matching and data ordering operations. This can increase the frequency at which successive read operations occur without an intervening write operation. The occurrence of such successive read operations of a storage location without an intervening write operation results in stale data being delivered repetitively from the storage location of the memory buffer.

An instance in which a data storage system having a stale data detection system has been used to advantage is in an error detection and correction system. The error detection and correction system provides better accuracy and reliability if certain words that are known to be defective can be identified by a technique such as a stale data detection system independently of the error detection and correction algorithm.

For example, a communications system such as a long distance telephone network has noise that may cause random errors in the data. Likewise, a data storage system such as a disk drive system or a tape drive system may have defects in the storage medium which may cause errors in the data. Even occasional intermittent errors in a stream of data can have a devastating effect on the integrity of the information being transmitted by the data stream.

A variety of error correction code (ECC) systems have been developed to detect and correct errors that may occur in an error prone data channel. To enable error detection and correction, a data stream is divided into blocks of data. Each block contains a selected number of words and one or more ECC words are added to the data block before the data block is transmitted through the communication channel or stored. As the data is received, the ECC system checks to determine if any errors have occurred in the data stream during transmission or retrieval of the information. The ECC words that were added to the data block are used to detect and correct a finite number of errors in each data block. Various known error correction codes that may be used to detect or correct errors include Hamming codes, check sums which represent the sum of a numerical value of all words in a block, and a Reed-Solomon code. A description of this code can be found in Peterson, W. Wesley and E. J. Weldon, Jr., *Error-Correcting Codes*, (MIT PRESS, 2nd Ed. 1972) pp. 1-17, 269-308, and 357-377.

After the data blocks have had ECC words added to them, synchronization information is typically added at fixed intervals in the data before storage or transmission through a data channel. As the data is received by a data buffer, the synchronization information is checked and used to place the data in the corresponding address location of the data buffer specified by the synchronization information. If errors occur in the synchronization information or if for any reason some of the synchronization information is not received, some of the data buffer locations which would normally be written to may not be written to during a data write operation. These unwritten data buffer locations would therefore contain old data which is known to be incorrect. This old data is also referred to as stale data.

Once a block of data has been stored, an error correction algorithm can be used to detect and correct a limited number of errors in the stored block of data. Many commonly used error correction algorithms can correct a greater number of data errors if the existence and location of any data that is known to be incorrect is identified. It is therefore important to detect and flag any stale data locations within the current block of data that represent data from a previous block that was not overwritten when the current block was stored in the data buffer. The ability of the error correction algorithm to detect and correct data is thus improved if these bad words are detected and identified with a flag which corresponds to the bad data word or its address storage location in the data buffer.

One system which detects stale data increases the width of the data buffer by one bit to provide a flag bit for each word location. Thus, if the data is received as 16 bit words, the buffer would be 17 bits wide. This extra bit is set to one when its corresponding data storage address location in the data buffer is written as a block of data is being received. When each data storage location is read during a subsequent error detection and correction process, the extra bit is read and then set to zero. If the extra bit is a one when the data storage location is read, then the data storage location has been written with the current block data since it was last read and the data location contains valid data that is not stale. If the extra bit is a zero, the data storage location has not been over-written by storing data from the current block of data since it was last read, and the data is therefore stale. The extra bit or flag bit can thus be read out from the buffer with each stored data word to indicate to the error detection and correction algorithm whether the word is known to be defective or whether it is potentially correct. These error indications increase the capacity of the error detection algorithm to detect and correct errors in the block of data.

The single extra bit system just described is relatively complicated and expensive to implement. The system must both read the extra bit and set it to zero in the same amount of time in which the system merely reads the other bit positions of any given storage location in the data storage buffer. For a given rate of reading the data buffer, a limited number of options are available to implement the single extra bit system.

One option is to use faster digital memory devices for the extra bit than for the digital memory devices used for the other data storage location at each address. This option requires that the control circuits and control timing signals for the extra bit be faster than the control circuits and control timing signal for the data storage location. Optimizing the timing of control timing signals of two different types of digital memory devices can be difficult to do and expensive in practice. Another option is to increase the speed of the digital memory devices used for the data buffer to match the speed of the digital memory devices used for the extra bit so that the digital memory devices used for the data buffer and the digital memory devices used for the extra bit can share control circuitry. This means that all the digital memory devices in the data buffer must be at least twice as fast as data is actually being retrieved and hence, more expensive.

If the data buffer already uses fast digital memory devices and needs to be operated near its maximum speed, it may be impossible to find a faster digital memory device in order to implement the extra bit used for the stale data detection. Alternatively, the faster memory may be inordinately expensive.

SUMMARY OF THE INVENTION

A low cost, high speed data storage system having a stale data detector in accordance with the invention includes a buffer data store having a user data store, a two bit flag data store, an output circuit and an control circuit that controls the operation of the buffer data store in response to commands received from an associated data processing system.

The user data store has a plurality of addressable data storage locations. Each individual addressable data storage location is addressed by the data processing system and stores and retrieves data in response to enable signals from the data processing system.

The flag data store has an addressable flag data storage location that corresponds to each user data storage location and that is addressed concurrently with the corresponding user data storage location. Each addressable flag data storage location has first and second stale data flag bits which are associated with alternate blocks of data and which are enabled and set to predetermined states by the control circuit. These flag bits can be read to indicate which words stored by the user data store are known to be invalid.

During a data read operation performed at an addressable location in the data buffer, a first of the two corresponding stale data flag bits is associated with a current block of data and selected for output as a stale data signal while a second of the two stale data flag bits is set to a predetermined first state indicating that the location contains stale or invalid data. During a subsequent write operation for a next block of data, the second flag bit is associated with this next block of data and the control circuit sets the second stale data flag bit to a predetermined second state indicating valid data at each storage location at which presumably valid data is written. At any location where data is not written because an error has been detected, the corresponding second flag bit remains in the first state to indicate that the storage location stores stale data from a previous block and not data from the current data block. By alternately using the first and second flag bits with alternate blocks of user data, the need to both read and write a flag bit during a single user data read cycle is eliminated.

In the previously discussed error detection and correction system, a storage system with a stale data detector can be utilized to indicate certain words that are known to be invalid prior to execution of an error detection and correction algorithm. The algorithm can then be more effective to detect and correct errors in received data. Alternately, the stale data indications can be used during error rate analysis to count occurrences of certain errors without trying to correct them.

A further application in which the high speed operation of a data store in accordance with the invention can be utilized is for generating a moving video image in a high speed shuttle mode. Data is read from tape in small blocks that are not contiguously located within frames of video data and written to the data storage system. As data is subsequently read to update the video display buffer, the stale data signal enables the use of only new video data to update the video display buffer.

The high speed access provided by the data storage system in accordance with the invention facilitates further use in writing frames of video data to magnetic tape. The video data is compressed and then written to a fixed sized data block on tape. Because the data compression results in a variable length data block for each frame, some unpredictable portion of the data block for each frame will contain nonvideo data.

It is desirable that this nonvideo data have a fixed data format such as all zeroes. This assures that a given video frame will always produce the same data block when stored in tape. Compressed video data can then be distinguished from filler data. This also enables the use of signature analysis for diagnostic testing. While a tape drive is known to be working properly, a selected video frame is stored on tape and then retrieved. As the frame is retrieved, the data content is convolved with a signature word. The resulting signature word is retained after the retrieval is complete.

Thereafter, the tape drive can be tested by writing the selected video frame and developing a new signature word as data is retrieved. If the new signature word matches the original signature word, proper operation is assumed. However, this signature analysis would not work if the nonvideo portions of the stored data block contained randomly varying data rather than all video data. Consequently, a compressed video image frame is assembled in the data storage system before it is written to tape. Thereafter, as the data is read from storage and written to tape, the stale data signal is used to change the nonvideo, filler portion of the fixed size data block to all zeroes.

BRIEF DESCRIPTION OF THE DRAWINGS

A better understanding of the invention may be had from a consideration of the following Detailed Description, taken in conjunction with the accompanying drawings in which.

DERAILED DESCRIPTION

Figure 1:
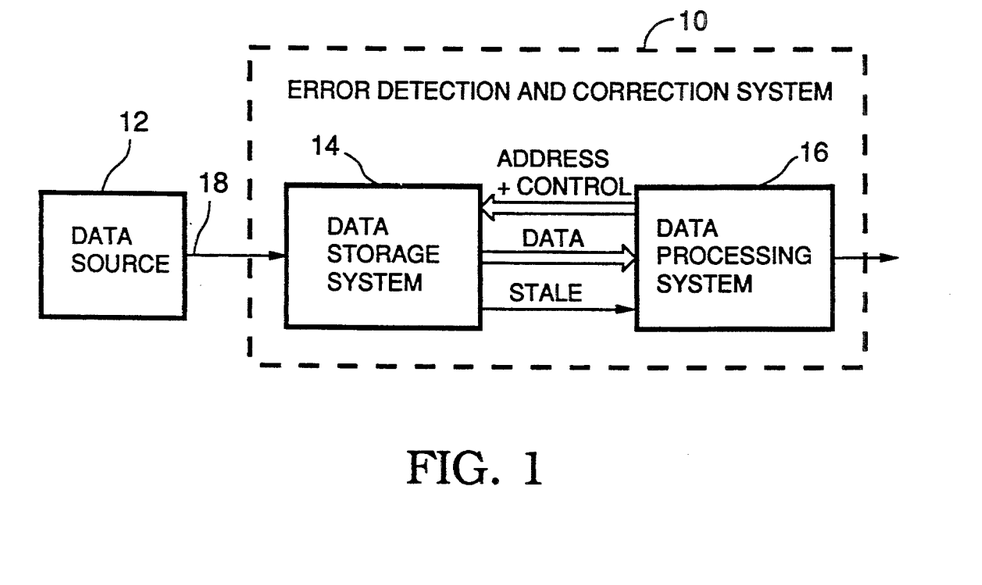
FIG. 1 is a block diagram representation of an error detection and correction system in accordance with the invention.

Referring now to FIG. 1, an error detection and correction system 10 in accordance with the invention includes, a data storage system 14 and a data processing system 16 coupled to control the writing of data into and the reading of data from data storage system 14. The error detection and correction system 10 receives a stream 18 of error prone data from a data source 12, such as a communications channel or magnetic recording device. Although the data source 12 is generally reliable, data errors may occur intermittently in the data stream 18. The data processing system 16 can correct errors in the data stream 18 using error detection and correction information contained within the received data. Alternatively, the data processing system 16 can merely count the data errors. As a counter of data errors the data processing system 16 provides information concerning the reliability of the data source 12.

The incoming stream 18 from the data source 12 is organized into blocks of data. As an example, assume that each data block contains twelve data words, each containing eighteen data bits. The first ten data words contain the user data or message. The remaining two words in each data block are ECC words that are used to correct errors occurring among the 12 words within the data block. The ECC words are created using an algorithm implementing an error correction code. The Reed-Solomon code is preferred for the present example, although other error detection and correction schemes could also be used. The Reed-Solomon code has the property that for a data block with a given number, N, of ECC words, all the errors in the data block can be corrected if the data block has N/2 or fewer words in error. Furthermore, if the location of the data words having errors is known, then all the errors in the ECC block can be corrected if the data block has N or fewer errors. In practice it is common to orient a large block of data in a matrix of rows and columns, to transmit the data in column order, to supply EC code for each row and to optionally supply EC code for each column as well. This does not change the principal of operation of buffer data storage system 14, which is explained in the context of a one dimensional example.

Figure 2:
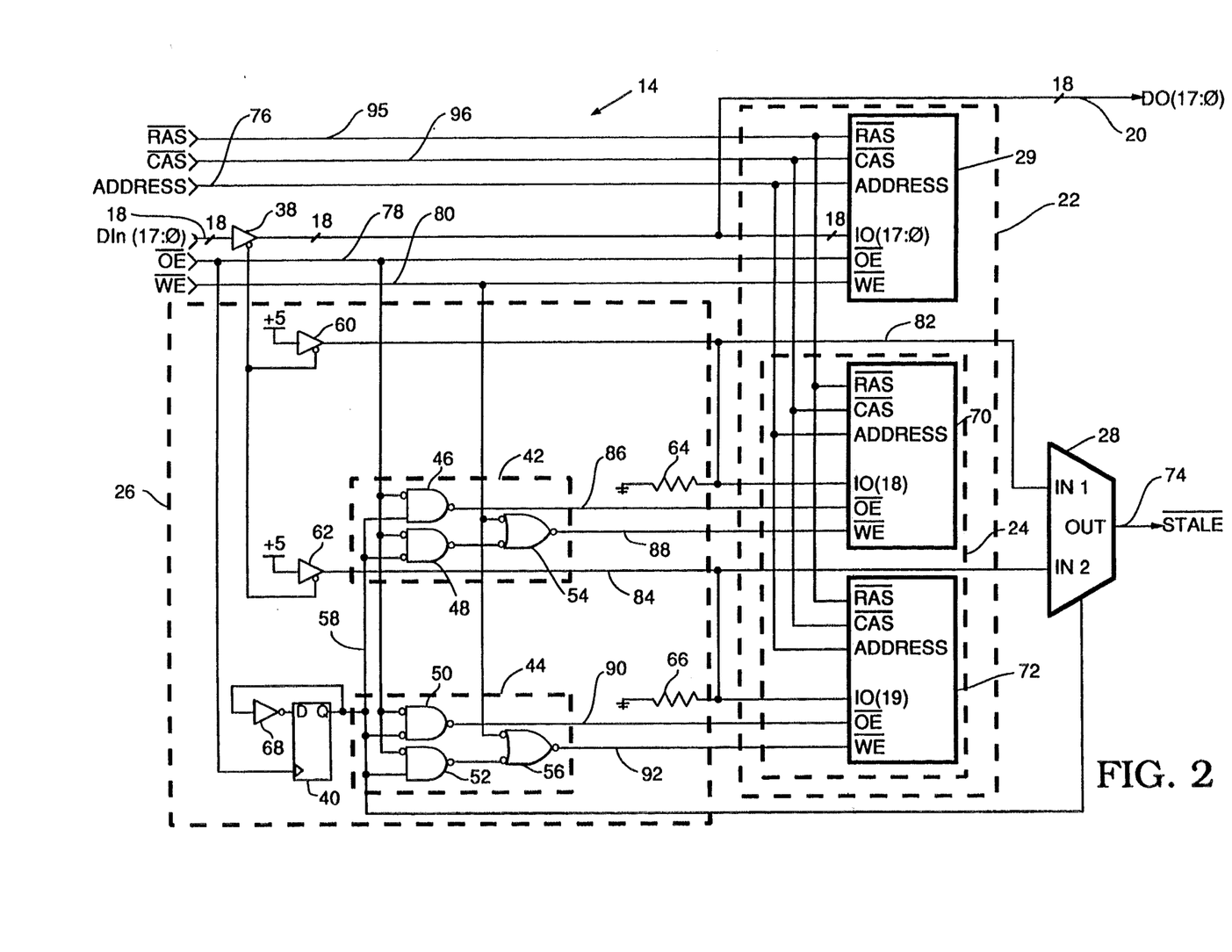
FIG. 2 is a schematic and block diagram representation of a data storage system portion of the error detection and correction system shown in FIG. 1.

Referring now to FIG. 2, the data storage system 14, includes a buffer data store 22, a control circuit 26 and an output circuit 28 for generating a stale data signal 74. The buffer data store 22 includes an 18 bit user data store 29 and a two-bit flag data store 24. The user data store 29 is implemented with a suitable type of addressable digital memory device such as a dynamic random access memory (DRAM) which may consist of one chip or an array of chips. The user data store 29 has an address input receiving at least 4 address bits (and typically more than 4) from address bus 76, row address strobes (RAS)_ and column address strobe (CAS)_ inputs receiving RAS_ and CAS signals 95, 96, respectively, and an 18 bit IO port coupled to receive data from an 18 bit input data bus 18 through a three-state buffer 38 and to drive an 18 bit output bus 20. User data store 29 also includes output enable (OE)_ and write enable (WE)_ inputs coupled to signal conductors OE_ and WE_.

The incoming data stream is transmitted on 18 bit parallel input data bus 18. The user data store 29 is organized into at least 12 addressable buffer storage locations, each having 18 bits at each location. The flag data store 24 has 12 first and second addressable flag data storage locations designated bits 18 and 19 that each correspond to a different addressable buffer data storage location in store 29.

The two bit flag data store 24 is implemented with two independent flag data stores 70, 72, each providing one bit and each being structurally similar to the memory sections implementing user data store 29. Stores 70, 72 each have RAS_, CAS_, and address inputs coupled to receive control signals from data processing system 16 along with the corresponding inputs for user data store 29. The IO, OE_ and WE_ terminals are separately controlled so that the first flag data store 70 can be written while the second flag data store 72 is read and alternately first flag data store 70 can be read while second flag data store 72 is written.

The control circuit 26 includes a single state element such as a D-type edge triggered state control flip-flop 40 and first and second logic gate circuits 42, 44. Logic gate circuit 42 includes two NAND gates 46, 48 and a first NOR gate 54. Logic gate circuit 44 includes two NAND gates 50, 52 and a NOR gate 56. The output enable signal 78 is connected to the clock input of flip-flop 40. The state control flip-flop 40 changes state each time the output enable signal 78 makes a low-to-high transition as the system 14 changes from a current block readout mode to a write mode for a next block of user data. The Q output of flip-flop 40 generates a select signal 58 which is inverted by an inverter 68 and coupled to the D input of the flip-flop 40. The select signal 58 is also coupled to one input of NAND gates 46, 48, 50, 52 and to the select input of multiplexer output circuit 28. The output enable signal 58 is connected to one input of NAND gates 46, 48, 50, 52. The select signal 38 is coupled to noninverting inputs of NAND gates 46 and 52 and is coupled to inverting inputs of NAND gates 48 and 50. Inverting inputs of NOR gates 54, 56 are connected to the outputs of the NAND gates 48, 52, respectively, and to a write enable signal 80. The output circuit 28 may be implemented as a 2:1 multiplexer. Output circuit 28 has data inputs connected to the data IO terminals of flag data stores 70, 72 and a select input coupled to the select signal 58 from flip-flop 40.

In the preferred data processing system 10, the data storage system 14 has a double buffer architecture, constructed from two identical data buffer systems of the type shown in FIG. 2. A block of data from source 12 is written into one of the two identical data buffer systems while an immediately previously received block of data is read from the other of the two data storage systems, (the read data processed for error detection and correction by data processing system 16). It is thus not necessary that the data storage system employ a single data storage buffer capable of simultaneously storing an incoming block of data and reading out a previous block of data. The following description of FIG. 5 will be in reference to the arrangement and operation of one of such two data buffer systems.

Figure 3:
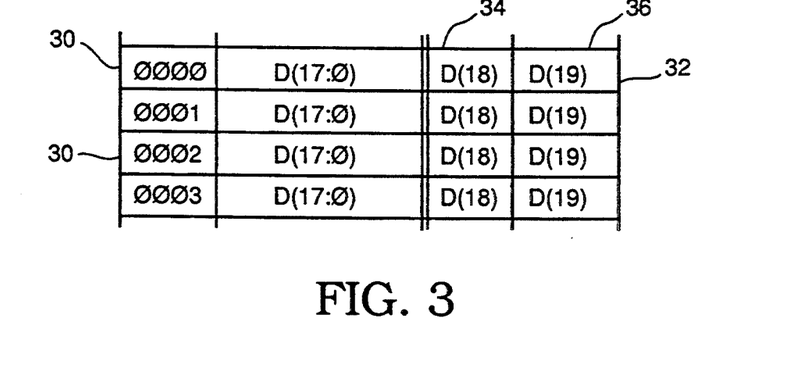
FIG. 3 is a diagram illustrating addressable buffer data store locations in the data storage system shown in FIG. 2.

Referring as well as FIG. 2 to FIG. 3, each of the data storage buffers of a double buffered data storage system 14 provides at least 12 addressable data storage locations 30, each having 18 bits provided by user data store 29 and two bits provided by flag data stores 70, 72. At each single addressable buffer data storage location 30, the location 30 is alternately written and then read for ECC processing. Alternate blocks of received data are alternately written and read as each new block is received and assigned to one buffer of the double buffered data storage system 14 on an alternating basis. Sometimes, however, a given address location 30 is not written. For example, an error in the data stream 18 might be detected as the data is received and cause the system 10 to refrain from writing the data word into storage system 14. When this happens, the location 30 is read twice without being written between the two reads. A stale data signal should then indicate the absence of a valid data word to processing system 16 to aid in the error correction process.

At system startup, the state of flip-flop 40 of each buffer determines for that buffer which of the flag data stores 70, 72 is the current store that is assigned to an incoming data block and the system sets this current store to 0 at each addressable data block storage location. Thereafter, whenever each buffer data store location 30 is written as the next block of data is received, the current flag bit which was most recently set to 0 is set to 1. Thereafter, each time a location 30 is read, two things are done concurrently. The flag bit which is not associated with a current block of data is set to zero and a flag bit associated with the current block of data is read and output through output circuit 28. A one indicates valid data and a zero indicates stale data. Flip-flop toggles with each new block of data received by the buffer to assign one of the flag data stores 70, 72 to the current block of data on an alternating basis.

To see how this works, consider a system which receives data blocks and puts them into the double buffered data storage system having two data buffer systems. One of the data buffer systems receives even-numbered data blocks and the other data buffer system receives odd-numbered data blocks. The following is an illustrative sequence of events that could occur in the data buffer system which is receiving even-numbered blocks:

Step 1: At startup, the state of flip-flop 40 is presumed to be zero and the first stale data flag bit 34 stored by flag store 70 is set to 0 at each addressable location therein.

Step 2: The first data block received after startup, data block 0, is received. Flip-flop 40 toggles to state one as signal OE_ goes inactive high to activate first flag bit 34. Each location 30 is written with Data 0, of data block 0, and the first and second stale data bits 34, 36 of flag store 70, 72 are set to 1 at each location 30 in which data is actually written. Only the first flag bit 34 in flag store 70 is of interest, although both flags are set.

Step 3: After data block 0 has been received and stored, OE_ goes active low, Data0 is read from each addressable buffer data store location 30, and the first bit 34 is also read and output to data processing system 16 through multiplexer output circuit 28. Since the first flag bit is set to 1 at each word location, the data Data0 is not stale. At the same time that each first flag bit is being read, the second flag bit 36 is written at each address location 30 and set to 0.

Step 4: After data block 0 has been read and processed for error detection and correction and a second data block has been written to the other data storage system, OE_ goes inactive high, toggling flip-flop 40 to state 0, a third data block, Data2, is received and each of the 12 locations 30 is written with data and, accordingly, the second flag bit 36 is set to 1 at each location 30 that is written. (Each corresponding first flag bit now represents a don't care state and is incidentally set to 1 as well.) Thus, flag bit 34 is associated with data blocks 0, 4, 8, 12, etc., while flag bit 36 is associated with data blocks 2, 6, 10, 14, etc., by the toggling of flip-flop 40. Data blocks 1, 3, 5 . . . are processed in an identical manner by the other of the two data buffer systems forming the double buffered data storage system 14.

Step 5: After data block 2 has been completely received and stored, OE_ goes active low, Data2 is read from the address 0000 and the corresponding second flag bit 36 is read and output through output circuit 28. Since it is set to 1, the data for word 0000 of Data2 is not stale. At the same time, the first flag bit 34 is set to 0 at address 0000. The remaining addresses 0001–1011 (binary) are similarly read and the corresponding first flag bit 34 of the flag store 70 is set to 0.

Step 6: After data block 2 has been read, data block 4 is received and stored. Flip-flop 40 toggles back to state 1 in response to signal OE_ going inactive high to select first flag store 70. However, if the data stream contains errors in the synchronization information, the system may not be able to determine where some portion of data block 4 should be written. Assume therefore that address location 0000 is not written and first flag bit 34 at this location is not set to 1, but instead remains at 0.

Step 7: When location 0000 is subsequently read again without having been written, the first flag bit 34 at location 0000 is read and is found to be set to 0, indicating that the data word at address 0000 is stale, i.e. the location 0000 is storing a word from data block 2 and not a word from data block 4. As each storage location for data block 4 is read, the second flag bit 36 is set to 0 at each addressable location while the first flag bit 34 is read, and the process continues from there.

In practice, the above sequence may be modified somewhat. For example, at startup it is not strictly necessary to set one of the stale data flag bits 34, 36 to 0 if the system can tolerate a stale data flag bit being incorrect and potentially giving a false indication of valid data for the first data block data read operation. By the second data block data read operation, the system will be in a known state and the stale data flag bits 34, 36 will be correct from then on. Alternatively, the system 10 can be initialized by receiving and storing a dummy data block that contains no data of interest before the first data block containing actual data is received.

In the present example, both stale data flag bits 34, 36 at a current address location are set to 1 during a data write operation without affecting the system. If both stale data flag bits 34, 36 are set to 1 each data write operation, then it is unnecessary to keep track of which bit is associated with the current block when writing, although it is still necessary to keep track of which bit is associated with the current block when reading.

The choice of setting the stale data flag bits 34, 36 to 1 during a write operation and to 0 during a read is arbitrary. It is just as easy to set the stale data flag bits 34, 36 to 0 during a write operation and to 1 during a read operation. This change would merely change the polarity of the stale data flag bits 34, 36, i.e., a 1 would indicate stale data, while a 0 would indicate valid data.

Figure 4:
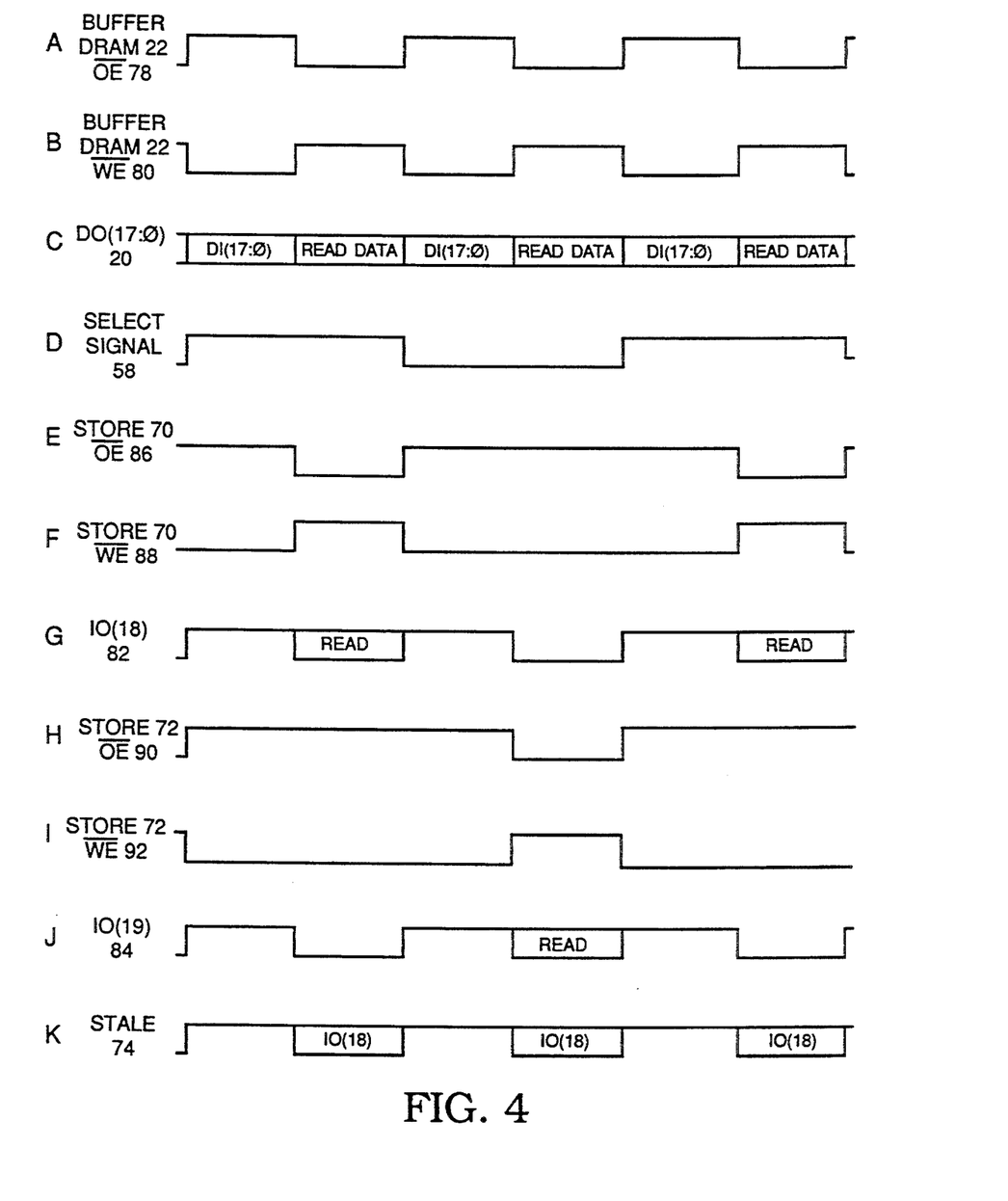
FIG. 4 shows a timing diagram illustrating operation of the data processing system shown in FIG. 2.

FIG. 4 is a timing diagram showing some of the timing of the data buffer system shown in FIG. 2, as employed in the preferred double buffered embodiment of the data storage system 14. Signals A, B, and C show the timing for the OE__, WE__ and data signals, respectively. When WE__ is active low and OE__ is inactive high, the buffer data store 22 is being written to, and the IO terminals (which are called DO(17:0) in FIG. 4) are driven by DIn(17:0) bus 18 through the data line three-state buffer 38. Many addresses are normally written to during a data block time interval while WE__ is continuously low and OE__ is continuously high by cycling the RAS__, CAS__, and Address signals. Then WE__ is brought high and OE__ is brought low and the RAS__, CAS__, and Address Signals are cycled as necessary to read the contents of the buffer data store 22.

Signal D illustrates select signal 58, which toggles each time a new block of data is to be written. As shown by waveform E, the output enable signal for flag data store 70 goes active low during the read portion of a cycle only when the select signal is high as alternate blocks of data are received and processed by storage system 14. Waveform F shows that the write enable signal for flag data store 70 is the inverse of the output enable signal. The IO for flag data store 70 produces valid read data when OE__ is active low (waveform G).

Waveforms H, I, J, and K correspond to waveforms E, F, G and K except that they relate to the second flag data store 72. They are assigned to the current block of data when select signal 58 is low.

Figure 5:
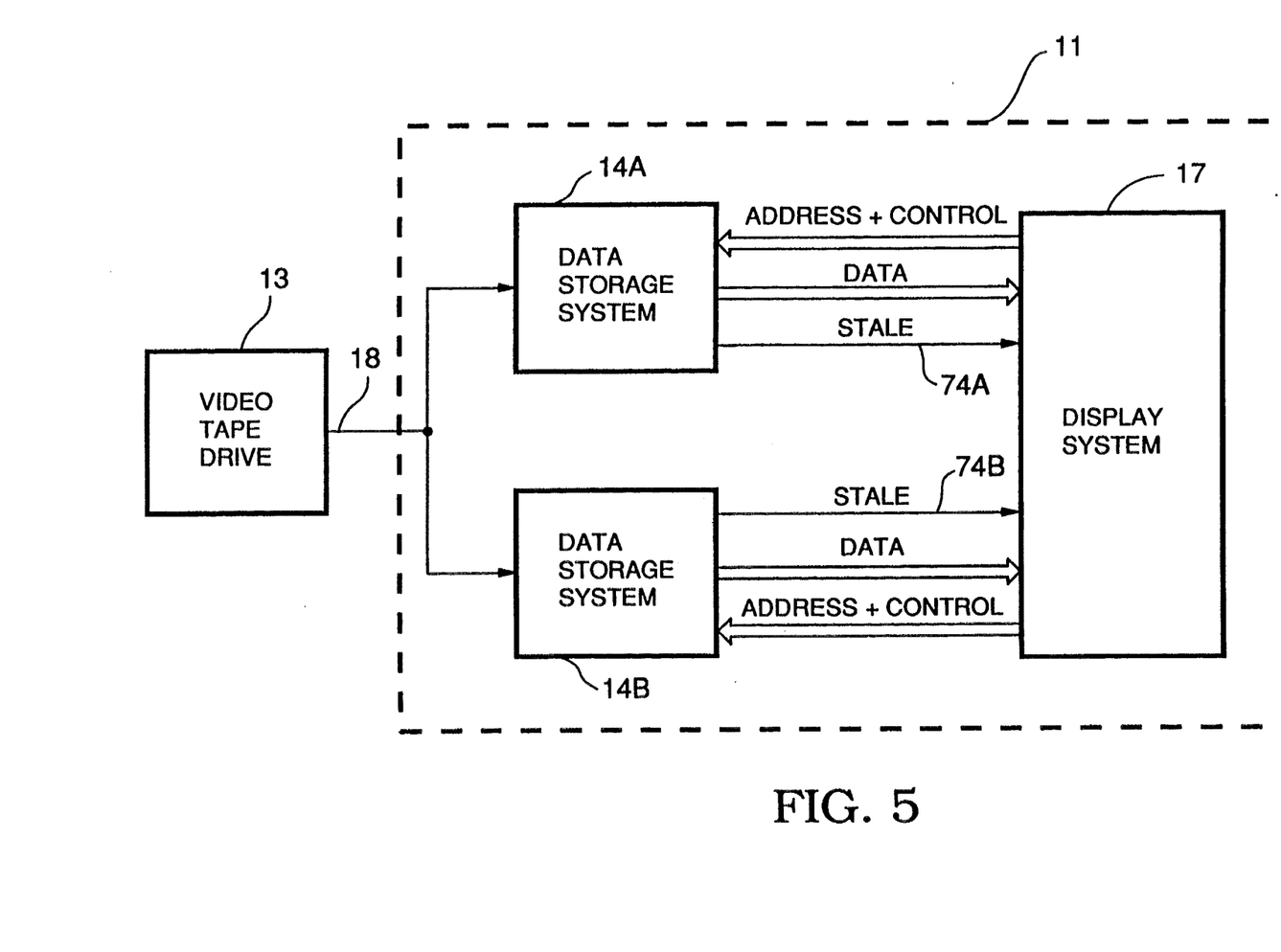
FIG. 5 is a block diagram representation of a video display system in accordance with the invention.

Referring now to FIG. 5, a video display system 11 in accordance with the invention displays a block of video data such as a field or frame of video data. The video display system 11 employs a double buffered data storage system, including two identical data buffer systems 14A, 14B coupled to a display system 17 in a double buffered manner. Each of the data buffer systems 14A and 14B is substantially identical to the data storage system 14 shown in FIG. 2, and the two buffers are coupled to a video tape drive 13 in a double buffered manner.

Each field or frame of video data is divided into data fragments. At normal speed playback, the entire field or frame of video data is retrieved by the video tape drive 13 and transmitted to the video system display 11. The video system 11 has relatively little effect on the displayed image in the normal playback mode. However, at high speed (or shuttle) playback, data fragments representing only a portion of a complete field or frame of video data are retrieved by the video tape drive 13, and commonly are retrieved from noncontiguous locations of the tape record medium. These retrieved data fragments are placed in appropriate locations in one of the data buffers 14A, 14B. The display system 17 forms a complete frame of video data from only the fragments of video data that have been most recently retrieved by the video tape drive 13. The display system 17 does not know which address locations in the data buffers 14A, 14B represent newly retrieved data and which represent data that has previously been read. By using the stale data signals 74A, 74B provided by the data buffers 14A, 14B, the display system 17 can distinguish the newly retrieved and written data from the stale data in either data buffer 14A, 14B. Only data which is not stale is used by the display system 17 to form the complete frame of video data.

While there has been shown and described above particular arrangements of a data processing system having a data storage system with a stale data detector and method of operation thereof in accordance with the invention, for the purpose of enabling a person of ordinary skill in the art to make and use the invention, it will be appreciated that the invention is not limited thereto. Accordingly, any modifications, variations, or equivalent arrangements within the scope of the attached claims should be considered to be within the scope of the invention.

What is claimed is:

1. A data storage system having a stale data detector, the system comprising:

a user data store having a plurality of addressable user data storage locations coupled to store and retrieve data in response to received addresses;

a flag data store having a plurality of addressable flag data storage locations, each associated with an addressable user data storage location and having first and second stale data flag bits at each addressable flag data storage location, the flag data store being coupled to store and retrieve data in response to received addresses at the addressable flag data storage locations associated with the addressable user data storage locations;

a control circuit coupled to the addressable flag data store and assigning the first and second flag bits to different alternate blocks of received data, the control circuit being operable as a block of data is read from addressable locations in the user data store to cause, at each corresponding addressable location in the flag data store, outputting of the flag bit assigned to the block of data as stale data signal and setting of the flag bit not assigned to the block of data to a first predetermined state, and the control circuit being operable as a block of data is written into the user data store to cause the flag bit in the flag store that is assigned to the block of data to be written to a second state different from the first state at each addressable location in the fag store that corresponds to an addressable location at which data is written in the user data store; and said control circuit including means for alternating the first and second states at a start of each successive data write operation.

2. A data storage system as defined in claim 1, wherein the control circuit operates during a data write operation by setting both the first and second stale data flag bits to the second predetermined state at each addressable location in the flag data store that corresponds to an addressable location in the user data store which is written with user data.

3. A data storage system as defined in claim 1, wherein the control circuit operates to initialize the data storage system prior to the receipt of user data by setting at least one of the first and second stale data bits to the first predetermined state at each addressable storage location in the flag data store.

4. A data storage system as defined in claim 3, wherein the control circuit initializes the data storage system by setting at least one of the first and second stale data flag bits to zero at each data storage location in the flag data store.

5. A data storage system as defined in claim 1, wherein the user data store and the flag data store each include a plurality of random access memory devices organized with corresponding addressable user data storage locations and pairs of respective addressable flag data storage locations for receiving first and second stale data flag bits.

6. A data storage system as defined in claim 1, wherein the system further comprises:
an output circuit coupled to the flag data store and the control circuit, the control circuit causing the output circuit to generate a stale data signal in response to the received data from the assigned flag bit.

7. A data storage system having a stale data detector, the system comprising;
a user data store having a plurality of addressable user data storage locations coupled to store and retrieve data in response to received addresses:
a flag data store having a plurality of addressable flag data storage locations, each corresponding to an addressable user data storage location and having first and second stale data flag bits at each addressable flag data storage location, the flag data store being coupled to store and retrieve data in response to received addresses at the addressable flag data storage locations corresponding to the addressable user storage locations;
wherein the addressable flag data store is comprised of first and second random access memory devices corresponding to the fast and second stale data flag bits, respectively; and
a control circuit coupled to the addressable flag data store and assigning the first and second flag bits to different alternate blocks of received data, the control circuit being operable as a block of data is read from addressable locations in the user data store to cause, at each corresponding addressable location in the flag data store, outputting of the flag bit assigned to the block of data as a stale data signal and setting of the flag bit not assigned to the block of data to a first predetermined state, and the control circuit being operable as a block of data is written into the user data store to cause the flag bit in the flag store that is assigned to the block of data to be written to a second state different from the first state at each addressable location in the flag store that corresponds to an addressable location at which data is written in the user data store.

8. A data storage system as defined in claim 7, wherein the first predetermined state of the first and second stale data flag bits is zero and the second predetermined state of the first and second stale data flag bits is one.

9. A data storage system as defined in claim 7, wherein the control circuit comprises:
a two state element which alternates states at a start of each successive data write operation; and
a logic circuit coupled to the two state element and to the first and second random access memory devices, the logic circuit assigning the first and second flag bits to alternate blocks of received data in response to the alternating states of the two state element.

10. A data storage system as defined in claim 9, wherein the logic circuit comprises:
first and second logic gate circuits, the first logic gate circuit being coupled between the two state element and the first random access memory device and the second logic gate being coupled between the two state element and the second random access memory; and a multiplexer coupled to the two state element and the first and second random access memories to output the assigned flag bit.

11. An error detection and correction system having a stale data detector, the system comprising:
a data storage system receiving data from a data source, the data storage system including;
a user data store having a plurality of addressable user data storage locations coupled to store and retrieve data in response to received addresses;
a flag data store having a plurality of addressable flag data storage locations, each corresponding to an addressable user data storage location and having first and second stale data flag bits at each addressable flag data storage location, the flag data store being coupled to store and retrieve data in response to received addresses at the addressable flag data storage locations corresponding to the addressable user data storage locations;
a control circuit coupled to the addressable flag data store and assigning the fast and second flag bits to different alternate blocks of received data, the control circuit being operable as a block of data is read from addressable locations in the user data store to cause, at each corresponding addressable location in the flag data store, outputting of the flag bit assigned to the block of data as a stale data signal and setting of the flag bit not assigned to the block of data to a first predetermined state, and the control circuit being operable as a block of data is written into the user data store to cause the flag bit in the flag store that is assigned to the block of data to be written to a second state different from the first state at each addressable location in the flag store that corresponds to an addressable location at which data is written in the user data store; and
a data processing system coupled to the data storage system for controlling operation of the data storage system and for detecting and correcting errors in user data stored by the data storage system in response to a stale data signal corresponding to the assigned flag bit.

12. An error detection and correction system as defined in claim 11, wherein the system is double buffered having two data storage systems, each alternatively receiving data from the data source and each coupled to the data processing system, the first and second data storage systems alternating at the end of each data read and write operation such that the first data storage system is writing during the data read operation of the second data storage system and such that the first data storage system is reading during the data write operation of the second data storage system.

13. An error detection system as defined in claim 12, including:
an error counter coupled to the data storage system for counting errors indicated by occurrences of the first state of a flag bit assigned to a current block of data as the block of data is read from the data storage system.

14. A method for detecting stale data at an addressable location in a user data store, comprising the steps of:
adding first and second flag bits to the user data store addressable location:
assigning said first and second flag bits on an alternating basis to blocks of data being received by the user data store addressable location;

setting at least one corresponding first and second stale data flag bit assigned to a current block of data to a first predetermined state during a data write operation; and outputting as a stale data signal the corresponding assigned stale data flag bit while setting the corresponding nonassigned stale data flag bit to a second predetermined state different from the first predetermined state during a data read operation.

15. A stale data detector system comprising:

means for storing user data at each of a plurality of addressable storage locations;

means for storing first and second flag bits at each of the addressable storage locations;

means for assigning one of the flag bits to a current block of data;

means for writing user data into an addressable storage location of the user data store and writing a first state to the assigned flag bit at the storage location; and means for reading user data from an addressable storage location, and for reading the assigned flag bit at the addressable storage location while simultaneously writing a second state different from the first state to the nonassigned bit at the same addressable storage location in response to the reading of user data at the addressable storage location.

16. A video display system comprising;

first and second data storage systems, each having a plurality of addressable user data storage locations for storing a complete frame of video data, said data storage systems operating in a double buffered manner to alternately receive and store fragments of a frame of video data and to indicate storage locations for storing data that has not been retrieved;

said data storage systems each including;

a user data store having a plurality of addressable user data storage locations: and a flag data store having a plurality of addressable flag data storage locations associated with each addressable user data storage location;

a display system coupled to both data storage systems, the display system polling each storage location of each data storage system in a double buffered alternating manner and retrieving for display only data that has been stored but not previously retrieved, the display system using the retrieved data to update a complete frame of video data that is being displayed by the display system:

a control circuit coupled to the flag data store: and wherein each addressable flag data storage location has first and second stale data flag bits which are assigned on an alternating basis to successively received fragments of video data, and the control circuit for each data store is operable as a fragment of a frame of video data is received and stored to set to a first predetermined state at least the assigned flag bit at each flag data storage location corresponding to a user data storage location that is written, and being operable as a fragment of a frame of video data is retrieved to output for each user data address location that is read a stale data indicating signal that is responsive to the assigned flag bit at the flag data storage location corresponding to the user data storage location that is being read, and to set to a [the]second state the nonassigned flag bit at the flag data storage location corresponding to the user data storage location that is being read.

17. A video data display system comprising:

at least one data storage system having a plurality of addressable user data storage locations for storing at least part of a block of video data, the data storage system alternately receiving and storing and alternately retrieving a fragment of the part of a block of video data:

said data storage system including:

a user data store having a plurality of addressable user data storage locations;

a flag data store having a plurality of addressable flag data storage locations associated with each addressable user data storage location;

a display system for displaying a block of video data, the display system being coupled to the data storage system to read each storage location of the data storage system and to update the block of video data with the data from a storage location that is read only when the storage location contains video data that has been written since the storage location was last read;

a control circuit coupled to the flag data store; and wherein each addressable flag data storage location has first and second stale data flag bits which are assigned on an alternating basis to successively received fragments of video data, said control circuit for each data store being operable as a fragment of a block of video data is received and stored to set to a first predetermined state at least the assigned flag bit at each flag data storage location corresponding to a user data storage location that is written, and being operable as a fragment of a block of video data is retrieved to output for each user data address location that is read a stale data indicating signal that is responsive to the assigned flag bit at the flag data storage location corresponding to the user data storage location that is being read, and to set to a second state the nonassigned flag bit at the flag data storage location corresponding to the user data storage location that is being read.

* * * * *